United States Patent [19]

Smart et al.

[11] 3,769,974

[45] Nov. 6, 1973

[54] BLOOD PULSE MEASURING EMPLOYING REFLECTED RED LIGHT

[75] Inventors: Richard C. Smart, Denver;
Kenneth D. Swonger, Littleton, both of Colo.

[73] Assignee: Martin Marietta Corporation, New York, N.Y.

[22] Filed: June 29, 1971

[21] Appl. No.: 157,944

[52] U.S. Cl. ............................................ 128/2.05 P
[51] Int. Cl. ............................................. A61b 5/02
[58] Field of Search .................. 128/2.05 E, 2.05 P, 128/2.05 R, 2.05 T, 2 C

[56] References Cited
UNITED STATES PATENTS

| 3,040,737 | 6/1962 | Kompelien et al. | 128/2.05 E |
| 3,628,525 | 12/1971 | Polanyi et al. | 128/2.05 P |
| 3,167,658 | 1/1965 | Richter | 128/2.05 P |
| 3,228,391 | 1/1966 | Fitter et al. | 128/2.05 T |
| 3,139,086 | 6/1964 | Botsch et al. | 128/2.05 P |

*Primary Examiner*—William E. Kamm
*Attorney*—Phillip L. DeArment et al.

[57] ABSTRACT

An improved pulse transducer for providing an output signal which varies as a function of the pulse rate of a living body includes a plurality of light emitting diodes from which red light of a wavelength of from 6,000 to 9,000 angstroms is emitted. This red light is transmitted through the skin of a portion of the body to the blood in an artery. The wavelength of this light is such that it is not transmitted through the blood but is reflected to a sensor with an intensity which varies as a function of variations in pulse wave pressure in the artery. The light emitting diodes are relatively cool to minimize changes in the characteristics of the blood vessels during examination. In addition, the use of red light tends to maximize the amount of light reflected back to the sensor from the red blood and to minimize the amount of light reflected by the white skin to thereby minimize the signal-to-noise ratio in the output signal from the sensor.

2 Claims, 3 Drawing Figures

PATENTED NOV 6 1973

3,769,974

INVENTORS
RICHARD C. SMART
KENNETH D. SWONGER
BY Yound and Tarolli
ATTORNEYS

BLOOD PULSE MEASURING EMPLOYING REFLECTED RED LIGHT

This invention relates generally to the measurement of pulse in a living body, and particularly relates to a new and improved pulse transducer and method for measuring pulse.

Pulse transducers of the photoelectric type commonly include a bulb which provides a source of white light which is directed toward a portion of the body through which blood is flowing. This white light is reflected from the body to a sensor. The intensity of the light reflected to the sensor will vary with variations in the pulse (arterial pulse pressure wave). Since the bulb is placed close to the skin, heat from the bulb may cause dilation of the blood vessels and alteration of the vascular bed of the portion of the body being examined. In addition, a considerable portion of the white light is reflected from the skin, instead of the blood, thereby tending to provide a relatively large signal-to-noise ratio.

In a known photoelectric pulse transducer, an attempt was made to reduce the effect of heat from a white light source or bulb by providing a metal block around the light source to act as a heat sink. In addition, in an effort to eliminate exterior and skin reflected light, red filters have been provided in association with the photosensors. One example of such a pulse transducer is disclosed in U.S. Pat. No. 3,103,214. Although these known photoelectric type pulse transducers have been used with varying degrees of success, they are not entirely satisfactory due to a relatively high rate of power consumption and heat generation by the light source and the relatively large signal-to-noise ratio which is produced by using white light.

The present invention provides a pulse transducer of the photoelectric type which includes light emitting diodes which remain relatively cool while providing red light. The wavelength of this red light is such that it is transmitted through the skin to the blood and is then reflected back to a sensor. When the blood pressure in an artery changes in response to a heart beat, the artery enlarges providing a relatively large reflecting surface and the intensity of the light reflected to the sensor is changed by a corresponding amount. Therefore, the output signal from the sensor is an analog of pulse wave pressure. Due to the light emitting diodes, the heat sink of the prior art is unnecessary and yet the heat problems are eliminated. Moreover, due to the red light source, a relatively low signal-to-noise ratio is obtained.

Accordingly, the principal object of the present invention is to provide a new and improved method for measuring pulse in a living body by directing red light onto a portion of the body through which blood is flowing and sensing the intensity of the reflected red light, and wherein the temperature of the portion of the body against which the light is directed is unaffected during pulse measurement.

Another object of this invention is to provide a new and improved method which includes a red light source for providing light of a wavelength which is reflected from the blood rather than the skin of a body with an intensity which varies with variations in pulse wave pressure.

These and other objects and features of the invention will become more apparent upon a consideration of the following description taken in connection with the accompanying drawings wherein.

Figure 1:
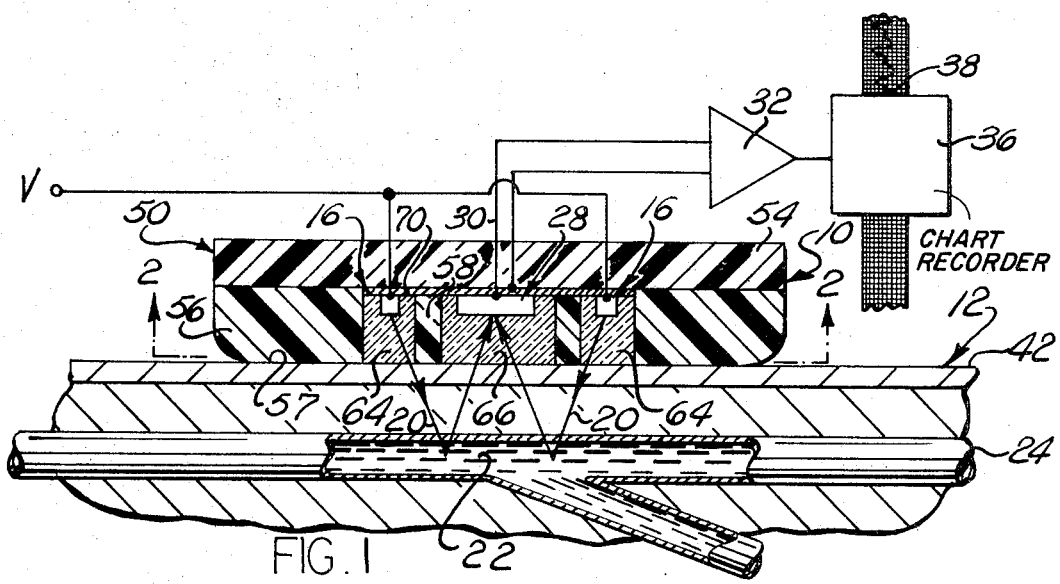
FIG. 1 is a schematic illustration of a pulse transducer constructed in accordance with the present invention and shown in association with an artery in a portion of a body being examined.

A pulse transducer 10 constructed in accordance with the present invention is shown in FIG. 1 in association with a portion 12 of a living body. The transducer 10 produces an analog signal which is representative of arterial pulse pressure. This signal can be used to determine, among other things, heart rate, pulse wave velocity, total peripheral resistance, and cardiovascular deconditioning. Although the pulse transducer 10 is disclosed herein in association with a human being, it should be understood that the pulse transducer could be utilized to examine an animal.

The pulse transducer 10 is of the photoelectric type and includes a plurality of light sources 16 which emit light rays 20. The light rays 20 are reflected from blood 22 flowing in an artery 24 to a phototransistor sensor 28 in the manner illustrated schematically in FIG. 1. Since the size of the artery 24 increases with increasing pulse pressure, the intensity of the light reflected from the artery to the sensor 28 varies with variations in the pulse wave pressure in the artery.

Variations in the light received by the sensor 28 result in the provision of an output signal, on a lead 30, which is an electrical analog of the arterial blood pressure wave. After the electrical signal has been strengthened by an amplifier 32, it is connected to a chart recorder 36. Of course, other types of display devices could be utilized rather than the chart recorder 36. The recorder 36 produces a curve 38 which is a printed analog of the arterial pulse pressure wave. On analysis, the curve 38 can be used to determine heart rate, pulse velocity, total peripheral resistance, cardiovascular deconditioning, and many other things.

In accordance with the present invention, the light sources 16 are light emitting diodes. The diodes 16 emit only red light having a wavelength of between 6,000 and 9,000 angstroms. In one specific embodiment of the invention, the diodes 16 emitted light having a wavelength of approximately 7,000 angstroms.

Since the light rays 20 from the diodes 16 are red, they are not reflected by the white skin 42 of an individual being examined. The red light rays 20 pass through the skin 42 and are reflected by the red blood 22 in the artery 24. Since the light which is received by the sensor 28 is reflected from the blood 22, the signal-to-noise ratio on the output lead 30 is relatively low. If the diode 16 emitted white light, a substantial portion of this light would be reflected by the skin 42 instead of the blood 22 and would result in a relatively high signal-to-noise ratio.

The diodes 16 provide a relatively cool source of light. Therefore, the diodes 16 do not increase the temperature of the adjacent tissue with a resulting alteration in the characteristics of the blood vessel 24. If a filament type bulb was utilized for the light source 16, a substantial amount of heat would be generated by the bulb. With a known pulse transducer of the photoelectric type having a bulb which provides a white light source, a rise in skin temperature to approximately 100° F. occurred. With one specific embodiment of the present invention in which light emitting diodes 16 were utilized as a source of red light, the rise in skin temperature was less than 2° F. Of course, the relatively large amount of heat provided by the filament type bulb of the known pulse transducer resulted in a dilation of the blood vessels and alteration of the vascular bed which was being examined.

Figure 2:
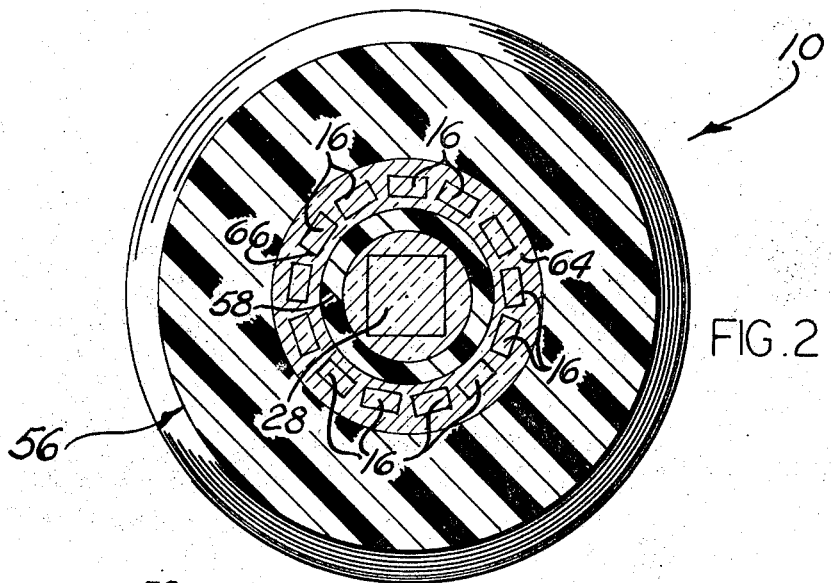
FIG. 2 is a plan view, taken generally along line 2—2 of FIG. 1, illustrating the relationship between a plurality of light emitting diodes and a phototransistor sensor in the pulse transducer.

The transducer 10 includes a housing 50 in which the diodes 16 are disposed in a circular array about the center of the phototransistor 28 (see FIG. 2). The housing 50 includes an opaque outer or upper wall 54 formed of epoxy. An annular lower wall 56 is also formed of opaque epoxy with a surface 57 which engages the skin 42 on the portion of the body being examined. An annular inner wall 58 is formed of opaque epoxy and blocks the direct transmission of light from the diodes 16 to the phototransistor sensor 28. The concentric walls 56 and 58 of the housing 50 prevent stray light from being transmitted to the sensor 28.

The diodes 16 and phototransistor sensor 28 are advantageously sealed or encapsulated in the housing 50 to enable the transducer 10 to be utilized in many different types of environments, such as environments where there is a relatively high humidity or explosive atmosphere. Accordingly, the space between the inner and outer walls 56 and 58 of the transducer 10 is filled with a transparent epoxy to form an annular window 64 which completely seals the diodes 16 from the surrounding environment. In addition, a circular window 66 formed of transparent epoxy is disposed in the center of the housing and seals the phototransistor sensor 28 from the surrounding environment.

Figure 3:
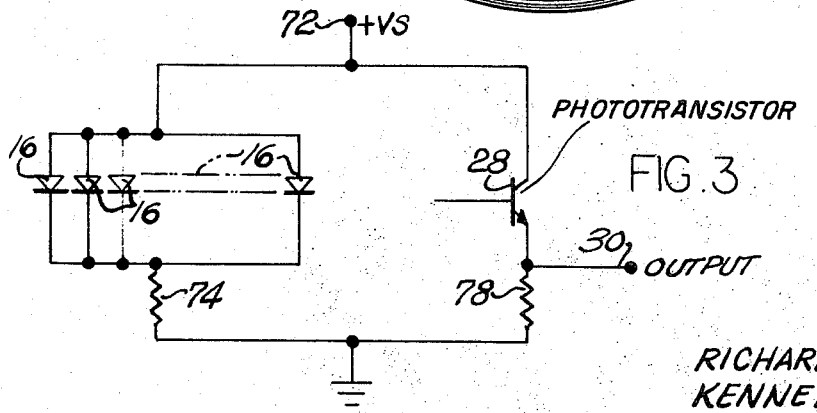
FIG. 3 is a schematic illustration of electrical circuitry for the pulse transducer of FIG. 1.

The diodes 16 are mounted in the housing 50 on a substrate 70 by thick-film semiconductor fabrication techniques. The diodes 16 are connected in parallel with each other (see FIG. 3) and are connected to a common voltage source 72. A current limiting resistor 74 is advantageously provided in series with the diodes 16. The phototransistor 28 is of the N-P-N type and is mounted on the substrate 70. As was previously explained, when the intensity of the light striking the phototransistor 28 is varied, the output signal on a lead 30 varies. A loading resistor 78 is connected in series with the phototransistor 28.

In view of the foregoing description, it can be seen that the pulse transducer 10 includes a plurality of red light emitting diodes 16. The red light from the diodes 16 is transmitted through the skin 42 to the blood 22. The wavelength of this red light is between 6,000 and 9,000 angstroms so that it is not transmitted through the red blood but is reflected back to the phototransistor sensor 28. When the blood pressure in the artery 24 changes, in response to a heart beat, the amount of reflected light reaching the phototransistor 28 changes and the output signal on the lead 30 is varied. As a result, the output signal is an accurate electrical analog of the arterial pulse pressure wave. The red light from the diodes 16 is reflected by the red blood with a relatively small signal-to-noise ratio so that the output signal on the lead 30 accurately represents the arterial blood pressure wave. An accurate reading by the transducer 10 is promoted by the fact that the diodes 16 emit very little heat so that there is little or no dilation of the blood vessels and alteration of the vascular bed under examination.

Having described a specific preferred embodiment of the invention, the following is claimed:

1. A method of sensing variations in pulsatile blood in a living body without substantially heating the pulsatile blood or tissue of the living body, said method comprising the steps of providing a plurality of light sources capable of emitting red light of a wavelength between 6,000 and 9,000 angstroms at substantially ambient temperature, positioning the light sources adjacent to the outer surface of the skin of the living body, transmitting red light of a wavelength between 6,000 and 9,000 angstroms from the light sources through the skin of the living body toward a portion of the living body in which pulsatile blood is flowing without heating the living body, reflecting red light from the pulsatile blood of the living body, sensing the intensity of the light reflected from the pulsatile blood of the living body, and providing an output signal in accordance with the intensity of the sensed light.

2. A method as set forth in claim 1 wherein said step of providing a plurality of light sources includes the step of providing a plurality of light emitting diodes and said step of transmitting red light includes the step of energizing the light emitting diodes.

* * * * *